Nov. 28, 1950     J. A. SOUTHERN ET AL     2,531,479
FLOW REGULATION VALVE
Filed Dec. 22, 1944
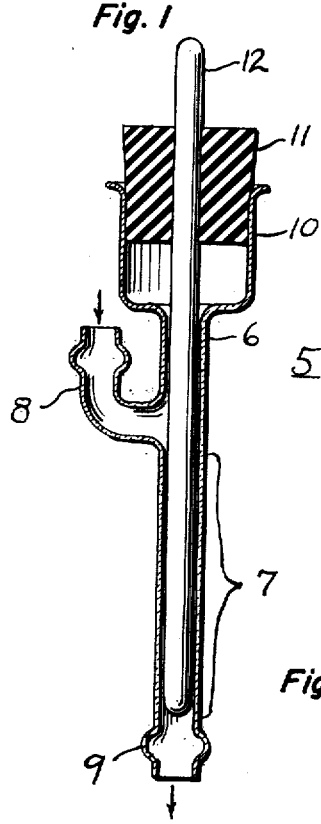
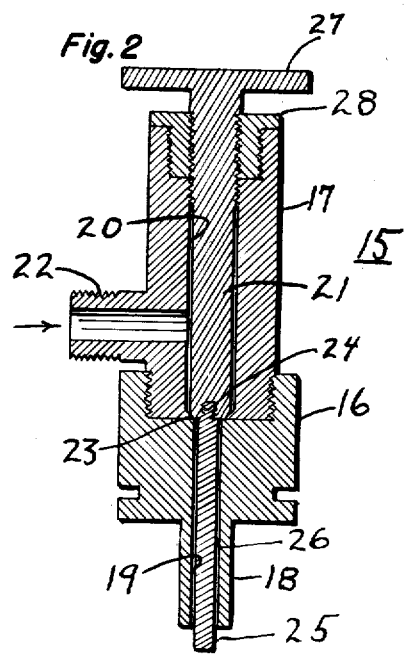
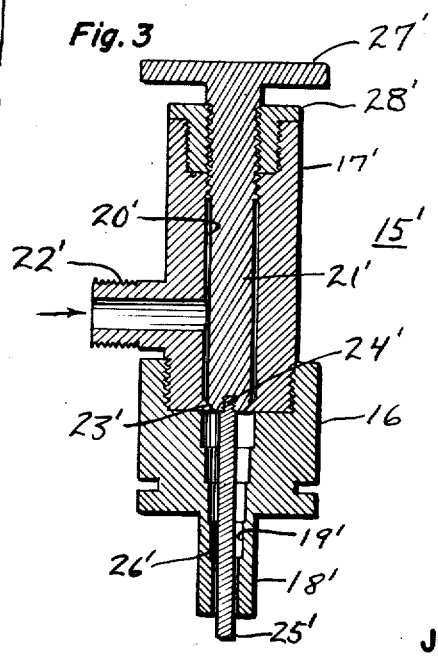
Inventors
JOHN A. SOUTHERN
STEPHEN B. BOGESE
By Fred S. Lockwood
and Henry Berk
Attorneys Patented Nov. 28, 1950

2,531,479

UNITED STATES PATENT OFFICE 2,531,479

FLOW REGULATION VALVE

John A. Southern and Stephen B. Bogese,
United States Army

Application December 22, 1944, Serial No. 569,384

2 Claims. (Cl. 137—69)

(Granted under the act of March 3, 1883, as
amended April 30, 1928; 370 O. G. 757)

The invention described herein may be manufactured and used by or for the Government for governmental purposes without the payment to us of any royalty thereon.

This invention relates, generally, to flow regulation valves whereby the rate of flow of a fluid can be controlled, and has particular relation to flow regulation valves having greatly increased range and accuracy.

Heretofore, flow regulation valves for carefully controlling the rates of flow of a fluid, have generally been of the so-called "needle valve" type. Essentially, this type of valve consists of a valve body having a conical shaped opening with a complementary conical shaped needle adapted to fit therein. Low pitch screw means are used to adjust the position of the needle in the conical opening.

Although needle valves are reasonably accurate for many purposes, their degree of accuracy is definitely limited and they are too inaccurate for certain applications. For example, in the field sampling of chemical warfare gas clouds, it is necessary to very accurately regulate relatively small flow rates i. e., 1 to 5 liters per minute, for long periods of time, such as from 6 to 8 hours. Obviously, even a small error in flow rate over such an extended period with such small flow rates, would build up a large error. It has been found that needle valves do not permit the degree of accurate regulation necessary for such field sampling. There are other instances wherein the inaccuracy of needle valves makes them undesirable, if not impractical.

Accordingly, the object of this invention, generally stated, is the provision of increment flow regulation or control valves having much wider range than valves of this type provided heretofore, and permitting a great deal more accurate regulation than has been heretofore possible with other types of regulation valves, such as needle valves.

An important object of this invention is the provision of improved flow regulation valves the range of capacity of which can be greatly extended by a simple and convenient interchanging of one part.

For a more complete understanding of the nature and scope of this invention, reference may be had to the following detailed description thereof, taken in connection with the accompanying drawings, wherein:

Figure 1 is a partial vertical sectional view of a laboratory embodiment of the invention;

Figure 2 is a vertical sectional view of an embodiment of the invention which has been utilized with a high degree of success in the sampling of chemical warfare gas clouds; and Figure 3 is a vertical sectional view of another embodiment of the invention wherein the capacity range can be greatly extended.

Referring to Figure 1 of the drawings, a valve 5 is shown having a multisection body member 6 which is preferably formed from glass, but which may be made from any other suitable material. The valve body or member 6 has a relatively long conduit section 7 provided with a side arm inlet connection 8 and an outlet end 9. An enlarged section 10 is provided at the top of the valve body 6 which is adapted to receive a one-hole stopper 11, as shown. A rod 12 of glass or other suitable material is slidably held in the stopper 11 and extends through the conduit section 7. The diameter of the rod 12 is such as to leave a sleeve shaped annular channel space and passage between the interior of the conduit 7 and the exterior of the rod 12. The effective length of the sleeve shaped annular space may be adjusted by raising or lowering the rod 12. In the position shown in Figure 1, the annular space is shown having about its maximum length. In operation, fluid, either gaseous or liquid, enters through the annular space and leaves the valve through the outlet end 9.

The shape of the annular space being uniform, it is an obvious hydraulic principle that the resistance to fluid flow through the valve 5 is directly proportional to the effective length of the annular space. Thus, the longer the length of this space the greater the resistance and conversely the shorter the effective length the smaller the resistance. For any given effective length and a given inlet pressure, the rate of fluid flow through the valve 5 will be extremely uniform. Adjustment of the position of the rod 12 permits very accurate and close control of the rate of flow.

Referring particularly to Figure 2 of the drawings, a flow regulation valve is shown generally at 15 comprising a lower section or portion 16 and an upper section or portion 17. Section 16 is provided with an extension 18 and a vertical hole 19 or flow conduit of uniform diameter extends centrally through the section 16, including the extension 18.

The upper section 17 is threaded at its lower end so that it may be screwed into a tap provided in the top of the lower section 16, as shown. A vertical, centrally disposed hole 20 or valve conduit is provided in section 17 which accommodates a valve stem 21. An inlet 22 is provided on the section 17, communicating at right angles with the hole 20. The lower end of the hole 20 is shaped as a truncated cone so as to provide a valve seat 23. The lower end of the valve stem 21 is also given a truncated conical shape so as to permit it to seat against the valve seat 23 in fluid tight relationship. A small hole is tapped into the lower end of the valve stem 21 so as to receive the threaded end 24 of a flow-obstructing member 25. The flow-obstructing or flow-control member 25 is rod shaped and has a uniform diameter. The member 25 is of sufficient length as to extend completely through the vertical hole 19 in section 16. The diameter of the rod 25 is such as to leave an annular space or passage 26 between the exterior surface of the rod 25 and the interior surface of the hole 19. This annular space 26 may actually be only a few thousandths of an inch in width, but for purposes of clarity, it is shown somewhat exaggerated in Figure 2.

The valve stem 21 is provided with a thumb wheel 27 at its upper end, and is threaded for part of its length so as to engage a threaded collar 28 provided in the upper end of section 17, as shown.

The valve 15 is shown in its completely closed position in Figure 2. In operation, the thumb wheel 27 is turned so as to raise the lower end of the valve stem 21 from the valve seat 23, thereby permitting fluid to flow through the valve 15. The flow resistance offered by the valve 15 depends upon the length of the annular sleeve shaped passageway 26. This length may be controlled by adjusting the position of the rod member 25 in section 16. That is, by raising the rod 25 the length of the annular passageway may be shortened, and, conversely, by lowering the rod 25 the length may be increased.

The range of valve 15 may be extended by replacing the rod 25 with other rods of different diameter.

Referring to Figure 3 of the drawings a valve 15' is shown which, except for one modification, is similar to valve 15 of Figure 2. The parts of valve 15' which correspond with those of valve 15 are designated by corresponding prime numbers. The substantial difference between valve 15' and valve 15 is the shape of the conduit or vertical hole 26' through the section 15'. The hole 26' in section 16' consists of five graduated sections stepwise decreasing in diameter toward the outlet. By adjusting the position of the rod 25' in section 16', it will be seen that critical, annular shaped orifices can be obtained of five different sizes. Furthermore, the flow resistance through any one of the different orifices can be increased or decreased depending upon the position of the rod 25' in that orifice. That is, the rod 25' can extend all the way through one of the orifice sections, or only part way through. Thus, valve 15' operates upon the same basic principle as do valves 5 and 15, of Figures 1 and 2, respectively, but due to the shape of the conduit 26', the valve 15' has a much greater range of capacity.

As indicated, the improved fluid flow control valves provided by this invention may be used to control the flow of such fluids as air, gas, water, gasoline, etc. They may be used to control the air intake of a carburetor for an internal combustion engine so as to give much closer control over a much wider range than is now possible with needle valves. Numerous other applications of the control valves of this invention will be obvious.

Since certain further changes and modifications may be made in the foregoing constructions, and different embodiments may be made without departing from the scope of this invention, it is intended that all matter described hereinabove or shown in the accompanying drawings, shall be interpreted as illustrative and not in a limiting sense.

We claim:

1. An increment flow control valve comprising in combination: an upper body portion and a lower body portion; a longitudinally disposed valve conduit in said upper portion; a coaxial longitudinally disposed flow conduit in said lower portion; a valve stem slidably mounted in said valve conduit and dimensioned to provide an annular channel space between said stem and the wall of said valve conduit; fluid inlet means in communication with said channel space; fluid outlet means at the lower end of said flow conduit; said flow conduit comprising a series of annular sections gradually decreasing in diameter toward the outlet end of said flow conduit; a flow control rod of uniform diameter slidably mounted in said flow conduit and dimensioned to extend throughout the length of said flow conduit and to provide an annular passage between said rod and the wall of the outlet end section of said flow conduit; the width of said passage being of the order of only a few thousandths of an inch; a valve seat in said valve conduit arranged for cooperation with the lower end of said stem; said passage, said flow conduit, and said channel space being positioned to be in inter-communication when said valve stem is in an unseated position; and combined adjusting and operating means in said upper body portion arranged to provide vertical adjustment for said rod and to effect the seating of said stem in said valve seat.

2. An increment flow control valve comprising in combination: an upper body portion and a lower body portion; a longitudinally disposed valve conduit in said upper portion; a coaxial longitudinally disposed flow conduit in said lower portion; a valve stem slidably mounted in said valve conduit and dimensioned to provide an annular channel space between said stem and the wall of said valve conduit; fluid inlet means in communication with said channel space; fluid outlet means at the lower end of said flow conduit; said flow conduit comprising a series of annular sections gradually decreasing in diameter toward the outlet end of said flow conduit; a flow control rod of uniform diameter slidably mounted in said flow conduit and dimensioned to extend throughout the length of said flow conduit and to provide an annular passage between said rod and the wall of the outlet end section of said flow conduit; a valve seat in said valve conduit arranged for cooperation with the lower end of said stem; said passage, said flow conduit, and said channel space being positioned to be in inter-communication when said valve stem is in an unseated position; attaching means on said stem for inter-engaging said rod and said stem; said attaching means being so arranged that said rod is readily detachable from said stem; said attaching means being adapted to separately engage others of a series of like replacement flow control rods of smaller diameter; and combined adjusting and operating means in said upper body portion arranged to provide vertical adjustment for said rod and to effect the seating of said stem in said valve seat.

JOHN A. SOUTHERN.
STEPHEN B. BOGESE.

REFERENCES CITED

The following references are of record in the file of this patent:

UNITED STATES PATENTS

| Number | Name | Date |
|---|---|---|
| 19,720 | Sullivan, et al | Mar. 23, 1858 |
| 1,716,195 | Stockstrom | June 4, 1929 |
| 1,718,763 | Sladky | June 25, 1929 |
| 1,735,182 | Rueppel | Nov. 12, 1929 |
| 1,801,959 | Hopkins | Apr. 21, 1931 |
| 1,871,287 | Whittaker | Apr. 9, 1932 |
| 1,941,453 | Whittington | Jan. 2, 1934 |
| 2,119,250 | Smith | May 31, 1938 |
| 2,341,394 | Sloan | Feb. 8, 1944 |